Patented Apr. 22, 1941

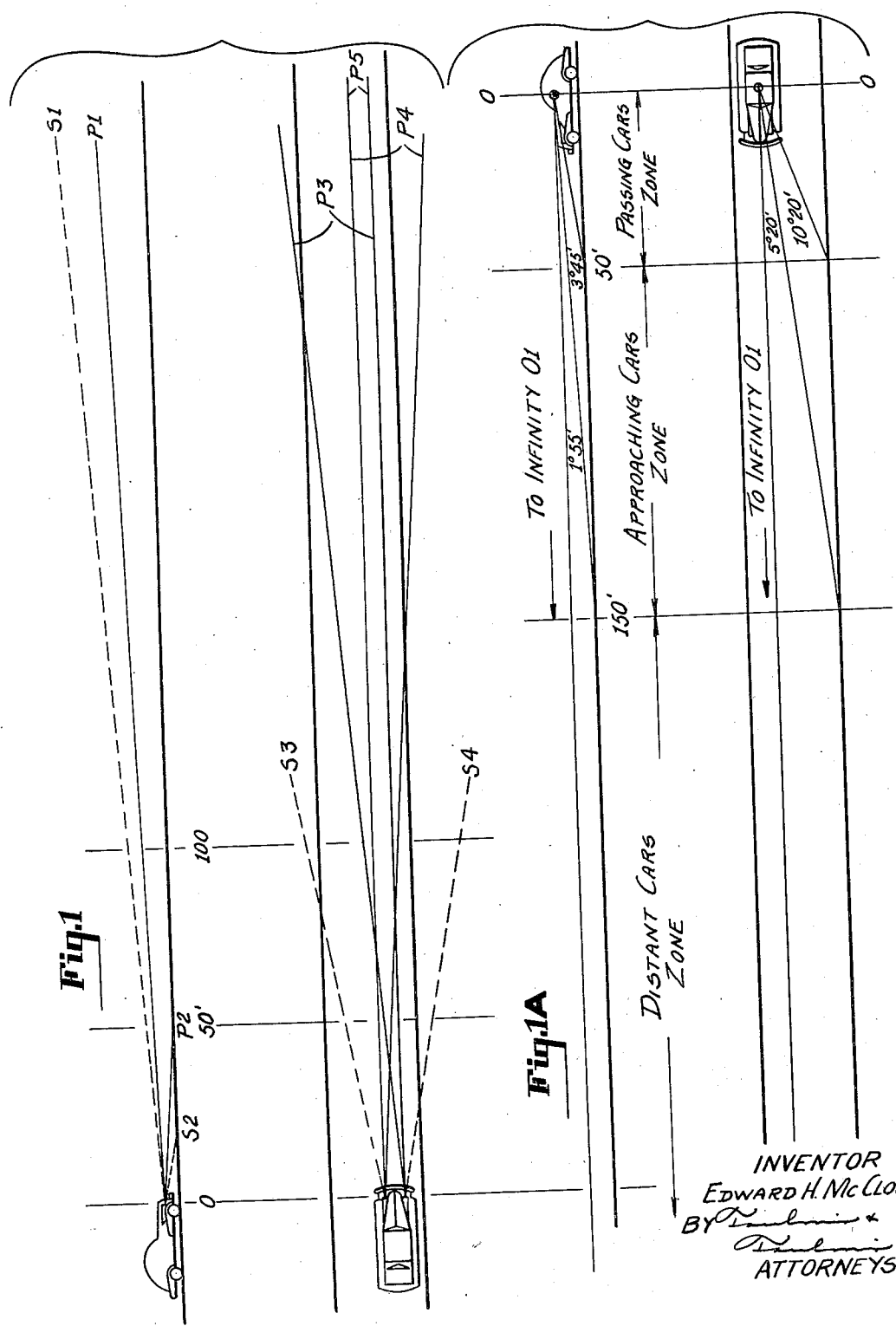

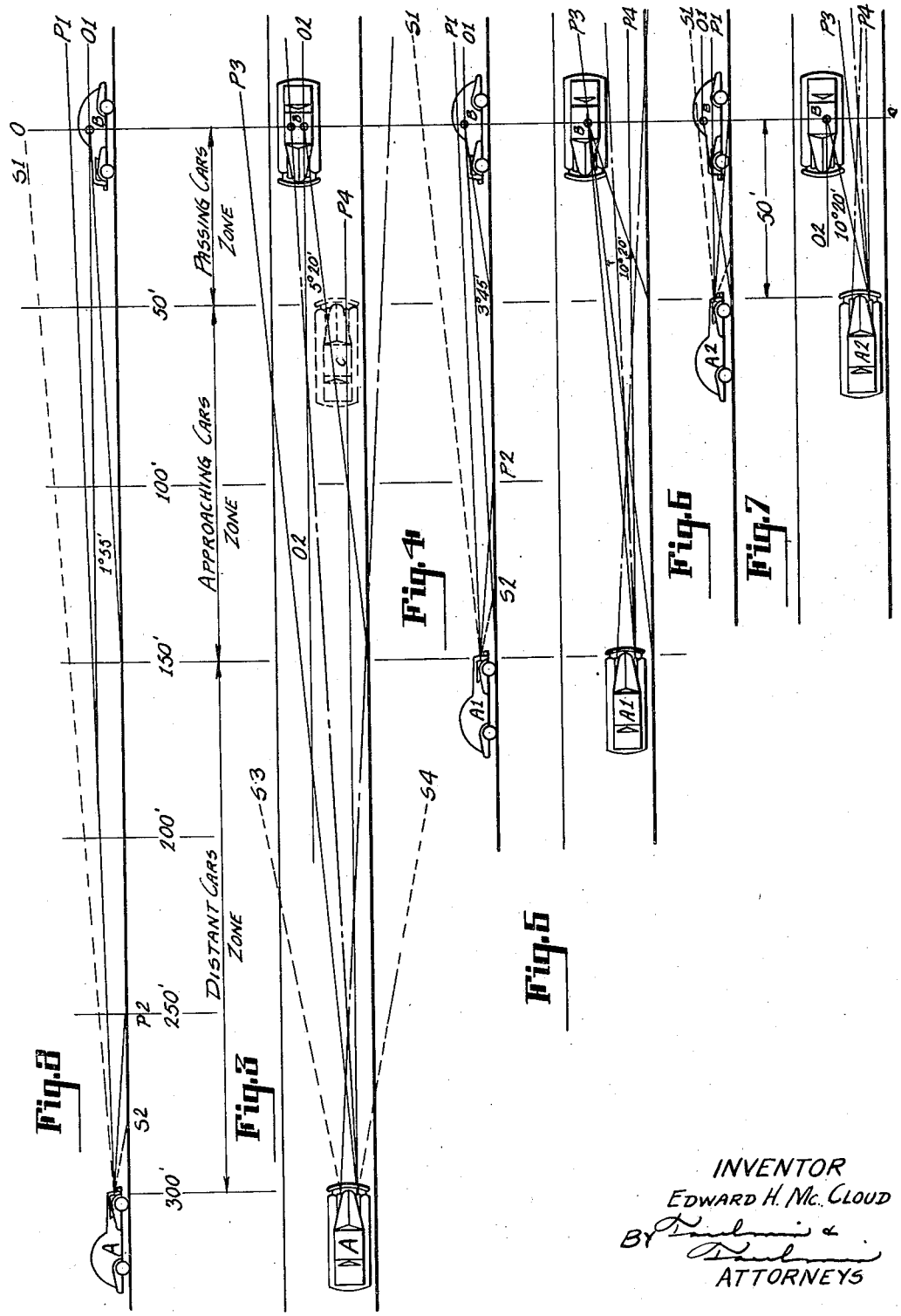

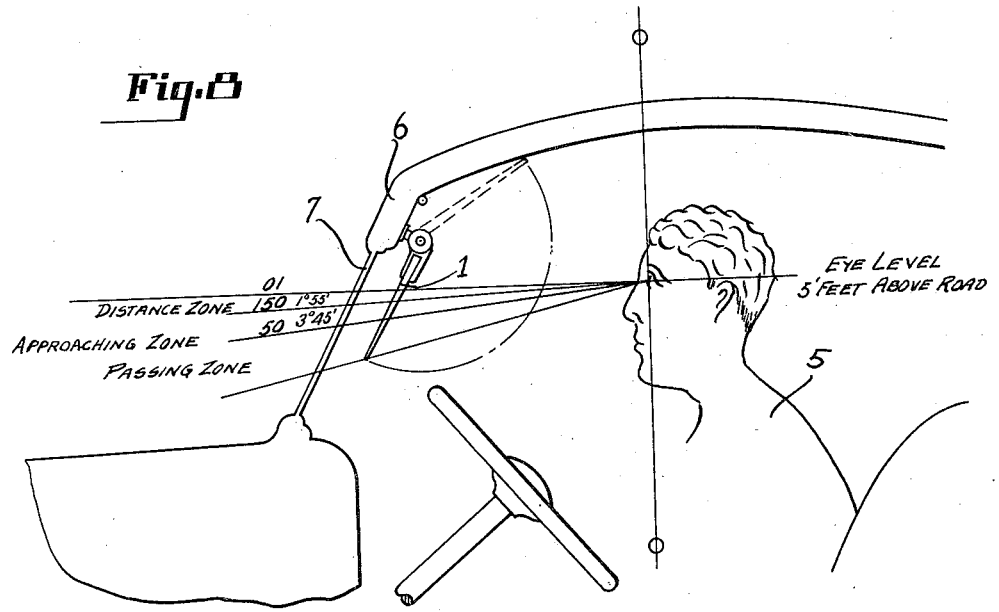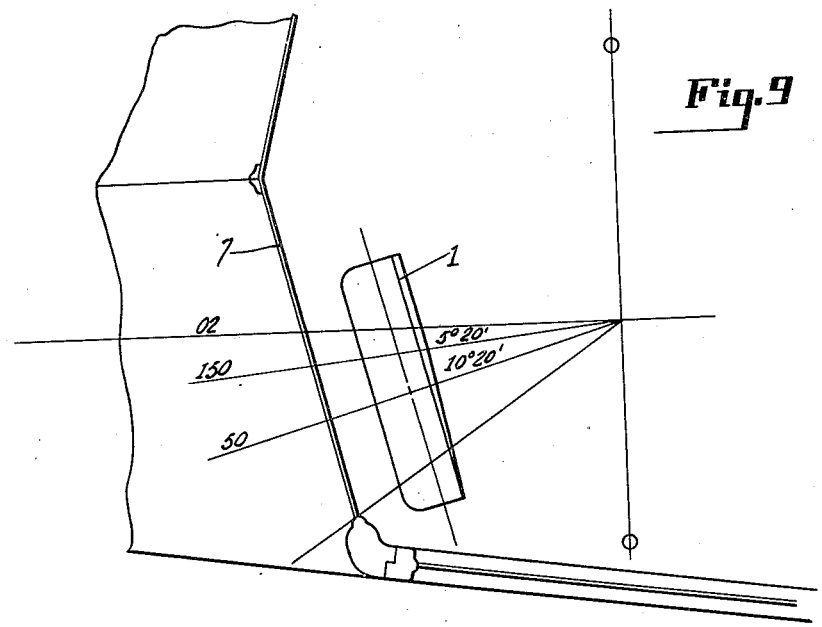

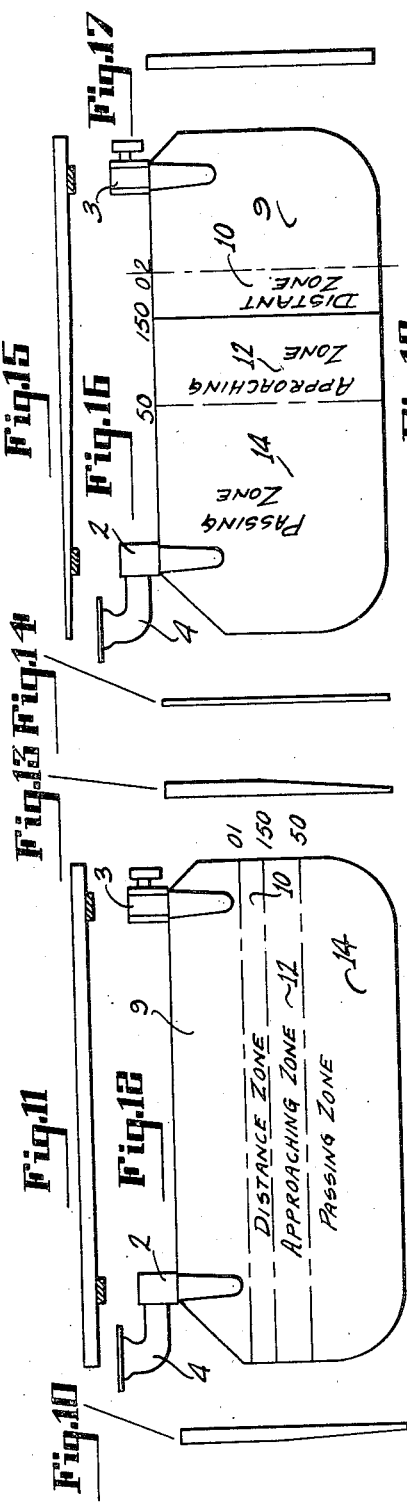

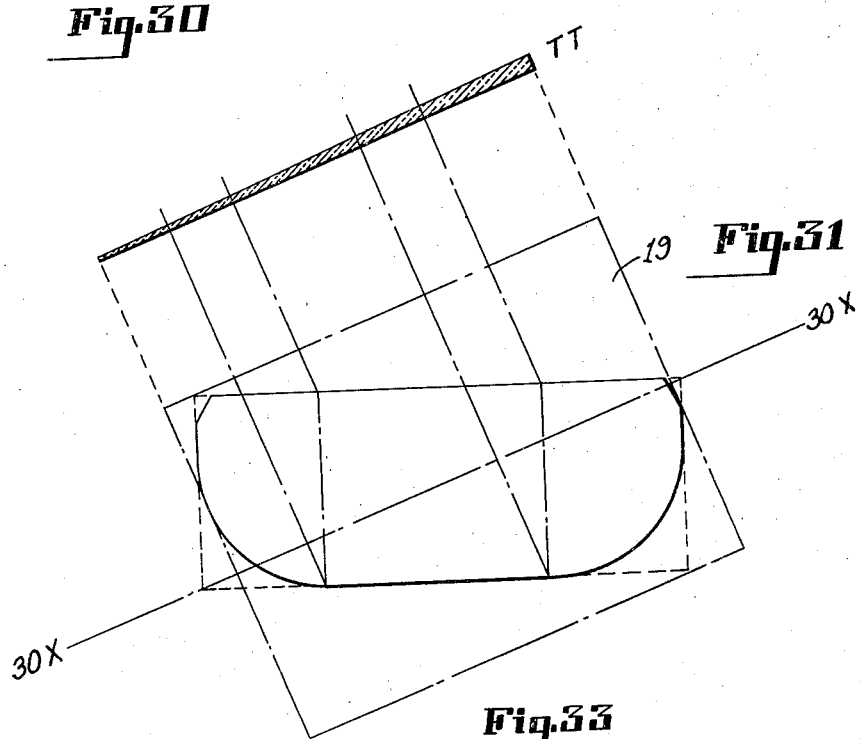

2,239,158

UNITED STATES PATENT OFFICE 2,239,158

ANTIGLARE SHIELD FOR AUTOMOBILES

Edward H. McCloud, Columbus, Ohio

Application October 28, 1938, Serial No. 237,484

7 Claims. (Cl. 296—97)

My invention relates to a safety screen for night driving, particularly adapted to automobiles, or other vehicles but not necessarily limited to this application.

The object of this invention is to provide means to reduce the hazard incident to night driving on public roads.

A further object is to provide means that will yield greater comfort to those who drive at night. Glaring headlights are one of the most common uncontrollable causes contributing to accidents.

It is the object of my invention to provide a shield of any transparent or translucent material of progressive color depth from one side to the other, or from the top to the bottom, or both, which can be suspended in front of the driver's eyes so as to automatically screen headlight beams of approaching automobiles in such a manner that the lights of greater intensity, which are further away and therefore directly in front of the driver's eyes, are reduced to the maximum amount and this reduction is progressively less as the source of the light approaches the driver, but is displaced laterally with respect to the driver so that the glare is thereby reduced.

It is a further object to provide a light reducing screen progressively arranged as to density and effectiveness in reducing headlight glare so that the more intense portion of automobile headlights, the maximum effect of which, upon a driver, occurs at a distance from him, is subject to the maximum reduction by reason of the driving screen and when the automobile having such headlights is displaced laterally in passing the driver of the car, he is only subject to the diffused light from the passing headlights, at which time there is the minimum of reduction of light by the screen to increase the clarity of vision of the driver during the critical period of passing an oncoming car when the car is closely adjacent to that of the driver.

Referring to the drawings:

Figure 1 illustrates in elevation and plan view a car having beams with two characteristics, that is, a narrow beam of high intense light that is projected at a great distance, and a broad beam that is projected at a lesser distance and is of lesser intensity so as to illuminate the highway on either side of the path of the car and to particularly illuminate passing vehicles.

Figure 1—A illustrates in elevation and plan a car and the visual angles both in vertical and horizontal planes through which the driver's vision would sweep in viewing a distant car as it approaches and passes. Also the imaginary zones to indicate relative positions of an approaching car.

Figure 2 is the side elevation of a highway and two cars approaching one another. The arrangement of light beams are shown for car A and the visual angles for the driver of car B.

Figure 3 is a plan view of Figure 2 showing the position of two cars as they approach and the position of a third car as it is passing one of them. The concentrated beams of light and diffused beams are indicated for one car, for the other the visual angle for the distant zone.

Figure 4 is a side elevation of two cars, one is entering the approaching zone.

Figure 5 is a plan view of Figure 4.

Figure 6 shows the two cars just about to pass one another in the passing zone.

Figure 7 is a plan view of Figure 6.

Figure 8 is a diagrammatic side elevation of an operator of an automobile sitting behind a steering wheel looking through the screen of this invention with an indication of the different zones of his vision, depending upon the distance the approaching car is from the operator. The particular screen employed is that shown in Figures 10, 11, 12, 13 and 18.

Figure 9 is a diagrammatic view showing the screen and the body of the automobile and the position of the observer when viewed in plan The screen employed in this case is that shown in Figures 14, 15, 16, 17 and 19.

Figure 10 is a left-hand elevation of the glass screen of Figure 12.

Figure 11 is a plan view of the top of the screen of Figure 12.

Figure 12 is a front elevation, looking from the inside of the automobile outwardly.

Figure 13 is the right hand end elevation of the screen of Figure 12.

Figure 14 is the left end elevation of the screen of Figure 16.

Figure 15 is a plan view of the top of the screen of Figure 16.

Figure 16 is a front elevation of the modified form of the screen looking from the inside out.

Figure 17 is the right end elevation of Figure 16.

Figure 18 is a plan view of the bottom of the screen of Figure 12.

Figure 19 is a plan view of the bottom of the screen of Figure 16.

Figure 20 is the left end elevation of the screen of Figure 22.

Figure 21 is a plan view of the top of the screen of Figure 22.

Figure 22 is a modified form of screen looking from the inside out.

Figure 23 is a right end view of the screen of Figure 22.

Figure 24 is a plan view of the bottom of the screen of Figure 22.

Figure 25 is a left end view of the screen of Figure 27.

Figure 26 is a top plan view of the screen of Figure 27.

Figure 27 is an inside elevation of a modified form of screen.

Figure 28 is a right end view of the screen of Figure 27.

Figure 29 is a plan view of the bottom of the screen of Figure 27.

Figure 30 is a section on the line 30×—30× of Figure 31. It is connected with Figure 31 by projection lines to indicate the thickness of the screen on such section line in Figure 31.

Figure 31 shows in dot and dash line the outline of a sheet of tapered glass or other similar material from which the full line indication of the screen has been cut.

Figure 32 is a left hand end elevation of the screen shown in full lines in the Figure 31.

Figure 33 is a top plan view thereof.

Figure 34 is a bottom plan view thereof.

Figure 35 is a right hand end elevation thereof.

Referring to the drawings in detail, A indicates one car and B the other car. C indicates the third car passing car B.

The screen is generally designated 1 and is mounted in supporting arms or brackets 2 and 3. The height of these brackets may be made adjustable if desired. One of them may be mounted upon a pivotal support 4 so that the screen can be adjusted rotatably in front of the eyes of the observer 5. This screen is supported from the roof 6 of the automobile behind the windshield 7.

Referring to Figures 10 to 13 and Figure 18, which illustrate the type of screen shown in Figure 8, the denser portion of the tapered glass sheet is at 9. This is a portion above the dot and dash line marked O—1. This screen is colored any desired color so that the thicker the screen the denser the color for screening purposes. The area 9 is particularly useful for screening out the intermittent flare from overhead lights used by highway lighting and the like.

The next succeeding zone is designated 10. This is the distant zone through which the observer views the beams of high intensity light directed in the eyes of the observer from an approaching car as hereinafter explained, in greater detail in connection with Figures 1 to 9. This intense beam of light is directed straight in front of the automobile at a great distance. It is narrow and concentrated directly in front of the automobile along the road and at sufficient elevation to be projected an appreciable distance in front of the automobile. Such a beam is designated in Figure 1 by P—1, P—2, P—3, P—4 and P—5. The latter reference P—5 refers to that portion of beams P—3 and P—4 which overlap producing an intensely illuminated beam of light. It is this beam which is viewed through the distant zone 10 through the screen in Figure 12.

The next lower zone of lesser colored intensity and of lesser glass thickness is the zone 12 which is the zone through which the lights of an approaching car are viewed when a car is between 150 and 50 feet from the observer. The major portion of the light beam P—1, P—2, P—3, P—4 and P—5 is directed beyond and to one side of the observer, that is the driver 5, as will be seen in Figure 5. The broader beams S—1, S—2, S—3 and S—4 are still troublesome but of lesser intensity but they are screened out by the approaching zone at 12.

When the cars pass the primary beams project beyond the car clearing it well to the side but the secondary beams designated as S—1, S—2 and S—3 still cover the car. These beams are of low candle power and are diffused by the lens. During this period in which the cars are from 50 feet apart from one another to actual passing the light is screened by the passing zone 14. The distances and zones are indicated in the numerals at the right hand side of Figure 12 opposite each zone line.

In this manner the use of a tapered glass, plastic or other transparent or translucent screen of progressive color densities arranged so that the density of each zone is in proportion to the intensities of the light beam encountered in the distance, at which such beam would be viewed, results in three things: (a) viewing a car through different vertical and lateral zones; (b) viewing the head lights of a car so that the farther the car is away from the observer, the greater the intensity of the light beams being viewed, because as the cars approach the more intense beams directly in front of the cars pass by the observer and the secondary beams are those that affect his eyesight; and (c) the use of screens of progressively colored density arranged vertically or laterally, or both, and the use of screens of homogeneous colored glass or other material of similar character and the variation of the intensities of different areas thereof by regulating the thickness thereof.

It will be understood, of course, that different layers of glass may be employed, or a single piece of glass ground to a taper, either vertically or laterally, or both.

The beam of light directly in front of an automobile of great intensity constituting a long distance, narrow projected beam of light marked P—1, P—2, P—3, P—4 and P—5, is designated the primary beam and the broader diffused rays of light S—1, S—2, S—3 and S—4 will be referred to as the secondary beam of light.

Referring to Figures 14, 15, 16, 17 and 19, which illustrate a form of screen where the zones are disposed vertically, the same zones are indicated by the same numerals. The effect is that shown in Figure 9.

In Figures 20 to 24, the screen of these figures has the upper right hand corner formed in a zone, 9. The glass tapers downwardly from the diagonal line 15 and from the horizontal line 16. The glass tapers leftwardly from the line 15 and the line 17.

The several zones 10, 12 and 14 are indicated in both the horizontal and vertical positions so that both horizontal and vertical screening is effected.

Referring to Figures 25 to 29, the screen is of uniform thickness above and to the right of the diagonal line 18 and tapers downwardly and leftwardly from that line. A modification of this is illustrated in Figures 30 and 31 wherein the four zones are still maintained for the horizontal as well as the vertical screening. In this manner, the distant intense rays are screened both vertically and laterally as indicated in Figures 8 and 9.

In Figures 30 and 31, a sheet of glass 19 shown by the dot and dash lines has a screen cut from it as shown in the full lines. The taper of this screen is shown in Figure 30, which is a section on the line 30×—30× of Figure 31, taken diagonally across the screen.

The taper of this screen is shown by the projection lines from Figure 31 to Figure 30.

Figure 33 and Figure 34 are top and bottom views showing the uniform leftward taper of the screen.

With this detailed description of the mechanism of the screen, the philosophy of this invention and its method of operation are described as follows. The blinding effect on the eyes is traceable principally to two causes: 1st. Persistence of vision wherein the sensation in the retina does not cease when the stimulus is removed, i. e., after viewing a brilliant light then shifting the eyes to the lower field, the bright image on the retina does not instantly disappear. 2nd. Interference—the driver of a car viewing a field illuminated by his own lights will experience interference from direct and brilliant beams of an approaching car. The stimulus induced by the brilliant beam entering the eye causes contraction of the iris, thus the light from lesser lighted objects entering the eye is insufficient for clear vision. To the driver objects appear in hazy and blurred definition and he becomes conscious of a feeling of insecurity and uncertainty. This experience is continually repeated with each approaching car and if prolonged produces a physical and mental strain, a condition fraught with danger.

The driver may misjudge the distance between himself and a passing car, or the edge of the road, or may fail to perceive obstructions, a pedestrian crossing, or vehicles entering from a side road.

Automobile headlights combine two methods of illumination which I term "primary" beam P—1, P—2, P—3, P—4 and P—5 and "secondary" beam S—1, S—2, S—3 and S—4. The primary are the rays from the lamps that are projected by the reflectors forming slender conical beams of intense brilliancy and long ranged. The secondary are the direct rays projected by the lens and are of low luminosity and are diffused to produce a general lighting of the road.

The former practice was to project the beams from each headlight in parallel. The present practice is to cross the beams approximately fifty feet in advance of the car. The beams are depressed but the divergence of the rays will illuminate a considerable area in both width and height, which increases as the distance from the car increases. Figure 1 shows the manner in which the two beams are crossed. Figure 2 shows an elevation of a highway with car A approaching car B. The distance separating the two cars is three hundred feet by scale.

The road in front of the car B I have divided into three zones as follows: passing cars—that portion of the road extending forward from car B to a point fifty feet in advance; approaching cars—that portion from the fifty foot point to a point one hundred and fifty feet in advance; and distant cars—from the one hundred and fifty foot point to infinity.

Determination of zone length is based on the angles of the light beams from car A as they relate to car B.

The arrangement of the drawings simplifies the explanation if car B is regarded as stationary and car A approaching.

To avoid confusion light beams are not shown from car B. The spread of the primary beams of the right hand light, indicated by P—3, most affect an approaching car from the opposite direction. Here the spread of the beam is indicated as it most affects an approaching car from the opposite direction. The secondary lighting is diffused and not serious, therefore, it enters the problem the same as the primary lighting, but in a lesser degree. The secondary lights are indicated by S—1 and S—2; the primary lights by P—1 and P—2, Figure 2.

It will be observed that the beam P—1 projects above the car B. In Figure 3, plan view, the lateral extension of the primary beam is indicated by P—3 and P—4 and entirely envelops car B, therefore, falls upon the eyes of the driver of that car.

Referring to Figure 4 which shows the car A one hundred and fifty feet in advance of car B and about to enter the zone of approaching cars, it will be noted that the primary beam P—1 has dropped to a position which just includes the eye of the driver of the car B.

Referring to Figure 5 it will be observed that the beam has contracted so that the line P—3 still impinges on the eye of the driver, this condition will cease by further advance of the car.

Referring to Figure 6 the car A is fifty feet from the car B and is entering the passing zone. It will be noted that the line P—1 defining the upper limits of the primary beam has now dropped below the eye of the driver of car B.

By referring to Figure 7 it will be noted that the lines P—3 and P—4 defining a beam is now projected beyond the car B and does not interfere with the vision of the car B.

Figure 8 shows a section of a front seat of a car, the position of the driver's eye which is on the line O, the line O—1 which is a level line of the eye and extends to infinity.

If the line of vision is dropped vertically one degree and fifty-five minutes that line would intersect the road surface at a point one hundred and fifty feet in advance of the car, or the near end of the zone of distant cars.

If the line of vision is further dropped three degrees and forty-five minutes it will intersect the road at a point of fifty feet in advance of car B, or the beginning of the zone of passing cars.

Figure 9 is a sectional plan view of a transparent driving screen and has drawn through it three lines indicating the three zones through which the line of vision will pass. Moving horizontally from right to left then the driver will see a distant car through the distant zone and as the car approaches he will next see it in the approaching zone and later in the passing zone.

In Figure 8 the driving screen is shown in section, the top of it being thick and tapering off at the bottom to a lesser thickness.

This screen is a transparent medium and for the purpose of illustrating we will assume it is made of glass of a green tint which filters out certain light rays. It follows that the thicker the glass the deeper the tint, so that the deeper tint will be heavy at the top of the screen and lighter as it approaches the bottom. The visibility through the screen will also increase as the line of vision moves from the top to the bottom. As has already been illustrated it is the glare from the lights of the distant car that falls upon the driver's eyes and interferes with his vision. To illustrate: referring again to Figure 3 the lights from the car A are enveloping the car B and, therefore, shining in the driver's eyes so that his vision of car C is not clear and distinct. If he views the car A through the driving screen he sees it through the thicker part where the color is denser, this dims the lights from car A and increases his ability to see car C, or let us consider it in this manner: If he is looking at car C his line of vision will be the line 50, now the light from the distant car A would have to pass through the thicker portion of the screen before it reaches his eye.

Figure 9 follows the same system except the eye rotates in a horizontal plane instead of a vertical, the line O—2 is directly forward and is infinite. Revolving the line of vision through an angle of five degrees and twenty minutes the line would intersect the left hand edge of the road at a distance of 150 feet, or at the near end of the zone of distant cars. If it is further revolved ten degrees and twenty minutes it will intersect the edge of the road at a distance of 50 feet so in the matter of distance these points coincide with those shown in Figure 8.

It will be noticed in this case that the driving screen is of uniform thickness to the right of the line 150 and from then tapers to a lesser thickness at the opposite end. The point where O and O—2 intersect is equidistant between the eyes of the driver.

I claim the general principle. While the screen may be made of tinted glass which increases its intensity of color by increasing the thickness, it may also be made by tinting a flat glass on its surface, or it may be made by introducing a color medium tinted between two pieces of flat glass, or many other ways.

In considering this problem of protecting the driver's eyes it should be borne in mind that he is not seriously concerned with distant cars except to know they are present on the road so he may be prepared to pass them later, he need not see them clearly as their lights inform him of their position, therefore, the driving screen may be densely tinted at the top to effectively dim the lights of the distant cars. He is concerned when the car enters the approaching zone and requires better vision, but as this transpires the lights on the approaching car no longer interfere with his vision, as the car enters the passing zone still better vision is desired and at that time the transparency of the screen is the greatest.

The period of time the driver of car B is subjected to the lights of an approaching car in the distant zone is considerable for he may see a distance of a mile or more during this time his eyes are protected by the screen, the time occupied by the car traversing the approaching zone is short and through the passing zone is but an instant.

This driving screen also provides eye protection from the reflected lights on wet streets and further may be used as a sunshade when the sun is low.

It will be understood that I desire to comprehend within my invention such modifications as may be necessary to adapt it to varying conditions and uses.

Having thus fully described my invention, what I claim as new and desire to secure by Letters Patent is:

1. A new article of manufacture for use as a light screen comprising a glass of uniform color and of progressive thickness whereby a progressive color density is secured in different zones in the glass screen, said zones in said screen being so arranged that the maximum color intensity is in a zone at one corner of the screen and said zones are progressively of lesser color intensity from said corner towards the bottom of the screen and from said corner towards the other side of the screen.

2. A new article of manufacture for use as a light screen comprising a glass of uniform color and of progressive thickness whereby a progressive color density is secured in different zones in the glass screen, said screen being so arranged that the line of greatest color intensity is diagonally diposed across said screen while said screen is arranged due to the decreasing thickness of said screen from said diagonal line in a succession of vertical and horizontal zones of decreasing color intensity laterally and from top to bottom.

3. In combination, in a colored screen, of a body of transparent material of uniform color density for a given thickness of the screen, said screen having a thickened area in one corner thereof and a diagonal ridge extending from the corner of the thickened area to the corner of the screen from which ridge the thickness of said corner tapers laterally and downwardly.

4. In combination in a screen, of a transparent body of material of uniform color density comprising a rectangular body divided by a diagonal line dividing the body into two areas one of which is of uniform thickness and the other is of progressively decreasing thickness extending downwardly from said diagonal line.

5. A new article of manufacture for use as a light screen comprising a transparent color tinted material of two color tint planes, one having the maximum color at the top and progressively diminishing towards the bottom to provide a light screen, the other color tint plane having the maximum color at one side and progressively diminishing to the opposite side, the two color planes forming a light screen having the maximum color tint approximately at the top of one side and the minimum color tint approximately at the opposite side and bottom thereof.

6. A new article of manufacture for use as a light screen comprising a transparent color tinted material in the form of a screen and having the maximum color at the top portion and progressively diminishing towards the bottom of the screen, said screen having the maximum color tint approximately at the top of one side and the minimum color tint at the opposite side and bottom portion of the screen.

7. A new article of manufacture for use as a light screen for automobiles comprising a sheet of transparent material of uniform color density and of greatly diminishing thickness from one edge to the opposite edge thereof whereby a progressive color density is secured in different parts of the light screen, and means for supporting said screen in such position in front of the driver of a car while the driver occupies a normal position therein that the maximum color density of the screen is located in such line of vision when the light viewed therethrough is at the maximum distance from the driver and the zones of decreasing density of the screen extend progressively from the point of maximum density to the point of minimum density in a direction requiring a shifting of the driver's line of vision from a normal position of maximum density to the point of minimum density of the screen in accordance with the progressive diminution of intensity of the lights of an approaching car.

EDWARD H. McCLOUD.